(No Model.)

W. H. CROOK.
BICYCLE BRAKE.

No. 486,630. Patented Nov. 22, 1892.

Witnesses:
Sidney P. Hollingsworth
Horace A. Dodge.

William H. Crook,
Inventor;
by his attorneys
Dodge & Sons.

UNITED STATES PATENT OFFICE.

WILLIAM H. CROOK, OF WASHINGTON, DISTRICT OF COLUMBIA.

BICYCLE-BRAKE.

SPECIFICATION forming part of Letters Patent No. 486,630, dated November 22, 1892.

Application filed July 18, 1892. Serial No. 440,365. (No model.)

*To all whom it may concern:*

Be it known that I, WILLIAM H. CROOK, a citizen of the United States, residing at Washington, in the District of Columbia, have invented certain new and useful Improvements in Brakes, of which the following is a specification.

My invention relates to brakes for vehicles; and it consists in various features, details, and combinations hereinafter set forth and claimed.

The present invention has reference more particularly to brakes designed for bicycles and tricycles, though the invention is applicable to any and all classes and styles of vehicles.

At the present time, when pneumatic tires are so extensively used, great annoyance and trouble are experienced by reason of the brakes tearing or cutting the tires, thereby allowing the air (which is forced into the tire at a pressure of about one hundred and fifty pounds) to escape and rendering the tire useless.

It is the object of my invention to produce a brake which shall be thoroughly efficient in action and which shall at the same time produce no injury to the tire.

To this end the invention consists in making the brake in the form of a brush, which while yielding sufficiently to prevent the rupture of the tire will form an efficient brake.

Figure 1:
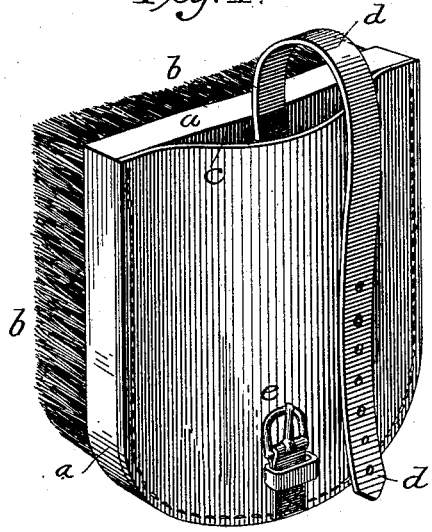
Figure 2:
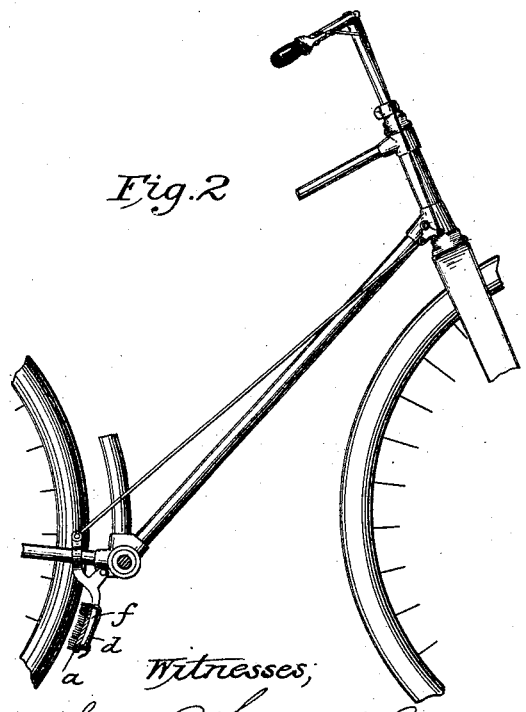
Figure 3:
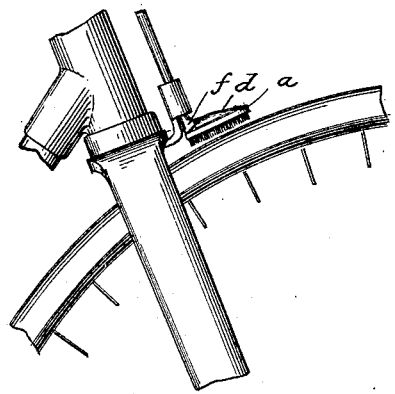

In the drawings, Figure 1 is a perspective view of my improved brake-shoe or braking device; Fig. 2, a view showing the device applied to the rear wheel-brake of a "Century Columbia" machine, and Fig. 3 a view showing the device applied to the front wheel-brake of a "Psycho" machine.

In its preferred form the brake-shoe or braking-surface consists of a brush comprising a backing *a* and bristles *b*. Upon the back or rear face of the brush I form a pocket *c* and provide the device as a whole with a strap *d* and buckle *e* or any other suitable retaining means. The backing *a* will advisably be made of leather or other flexible material, so that the brush may adapt itself to the curvature in cross-section of the ordinary brake-lever or brake-spoon, which is inserted into the pocket. The form of brush herein shown and described was devised with particular reference to the brake-lever employed on the "Columbia" machine, said lever being bifurcated at its upper end and allowing the strap *d* to pass over the upper edge of the lever or spoon *f* between the arms, as shown in Fig. 2. When the brush is applied to other machines having different styles of brake levers or spoons, the strap or other fastening device will have to be differently arranged. The brush will last quite a long time and when worn may be readily replaced by a new one. The pocket formation keeps the brush from turning upon the lever or spoon; but it is not essential.

Being the first to provide a brake-shoe with a pocket to receive or fit upon the ordinary brake lever or spoon, I claim such a shoe regardless of the nature of the braking or rubbing surface.

Having thus described my invention, what I claim is—

1. In a vehicle, the combination, with the brake lever or spoon, of a brake-brush applied thereto.

2. In a vehicle, the combination, with the brake lever or spoon, of a brake-brush and means for detachably or removably securing it to the lever or spoon.

3. In a vehicle, the combination, with the brake lever or spoon, of a brake-brush provided with a pocket and securing means.

4. In a vehicle, a brake-brush provided with a flexible back.

5. In a vehicle, the combination, with the frame and wheels, of the lever *f*, pivoted to the frame, the brake-brush applied thereto, and the strap *d* for securing the brush to the lever.

6. As a new article of manufacture, a brake-shoe for application to the brake-spoon of an ordinary bicycle-brake, provided with a pocket to receive said spoon, whereby it is rendered capable of application to the existing brake without previous special adaptation of the brake-spoon to receive it.

In witness whereof I hereunto set my hand in the presence of two witnesses.

WILLIAM H. CROOK.

Witnesses:
  E. W. HALFORD,
  E. F. TIBBOTT.